United States Patent

[11] 3,554,083

| [72] | Inventors | William R. McKelvy, Jr.;<br>Douglas J. Lamb; William T. Dowell,<br>Pensacola, Fla. |
|---|---|---|
| [21] | Appl. No. | 776,629 |
| [22] | Filed | Nov. 18, 1968 |
| [45] | Patented | Jan. 12, 1971 |
| [73] | Assignee | Monsanto Company<br>St. Louis, Mo.<br>a corporation of Delaware |

[54] AUTOMATIC BLADE-EDGING MACHINE
10 Claims, 5 Drawing Figs.

[52] U.S. Cl. .................................................. 90/21,
 90/11; 51/76; 83/410; 198/179
[51] Int. Cl. ....................................................... B23c 9/00,
 B65g 17/12
[50] Field of Search .......................................... 90/21,
 21.02, 11, 78; 51/38, 76, 110, 215.5, 215.6;
 83/410; 198/179; 143/49.1; 144/245—1.5, 12, 14,
 134.7

[56] References Cited
UNITED STATES PATENTS

| 1,368,583 | 2/1921 | Thompson .................... | 90/21 |
| 1,645,600 | 10/1927 | Kohler ......................... | 198/179X |
| 1,748,368 | 2/1930 | Shaw ........................... | 144/134.7 |
| 2,794,541 | 6/1957 | Chayka ........................ | 198/179X |
| 3,185,039 | 5/1965 | Graf et al. .................... | 90/78 |

*Primary Examiner*—Gil Weidenfeld
*Attorneys*—Alexander Kozel, Stanley M. Tarter and Roy P. Wymbs

ABSTRACT: An automatic blade-edging machine having a driven, endless conveyor that circulates a train of spring-biased, modular blade carriers into and out of cammed and uncammed positions to effect blade aligning, clamping and unclamping functions, and into and out of the path of cutting tools to form edges on blades clamped within the carriers in continuous and repeating sequence.

PATENTED JAN 12 1971

INVENTORS
WILLIAM R. McKELVY, JR.
WILLIAM T. DOWELL
DOUGLAS J. LAMB

BY Alexander Kozel
AGENT

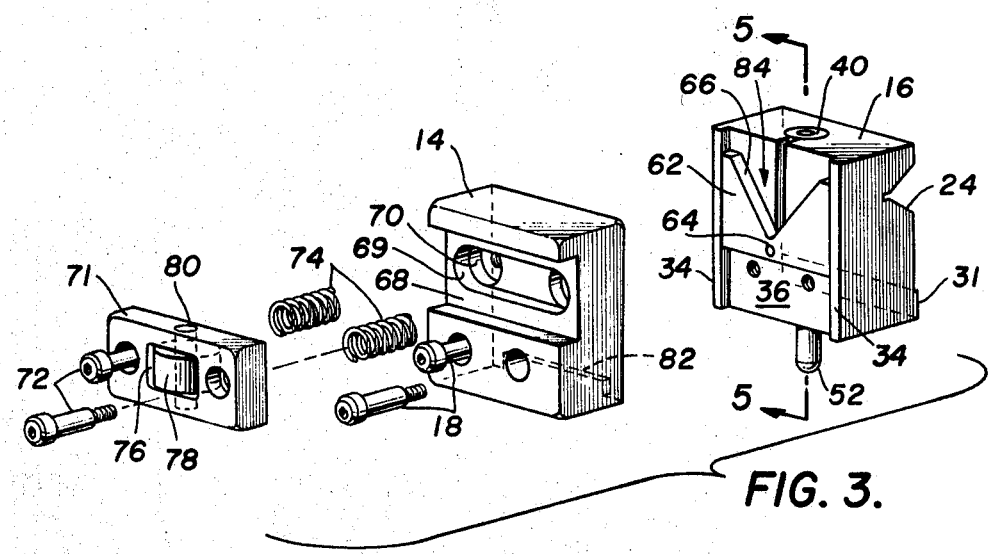
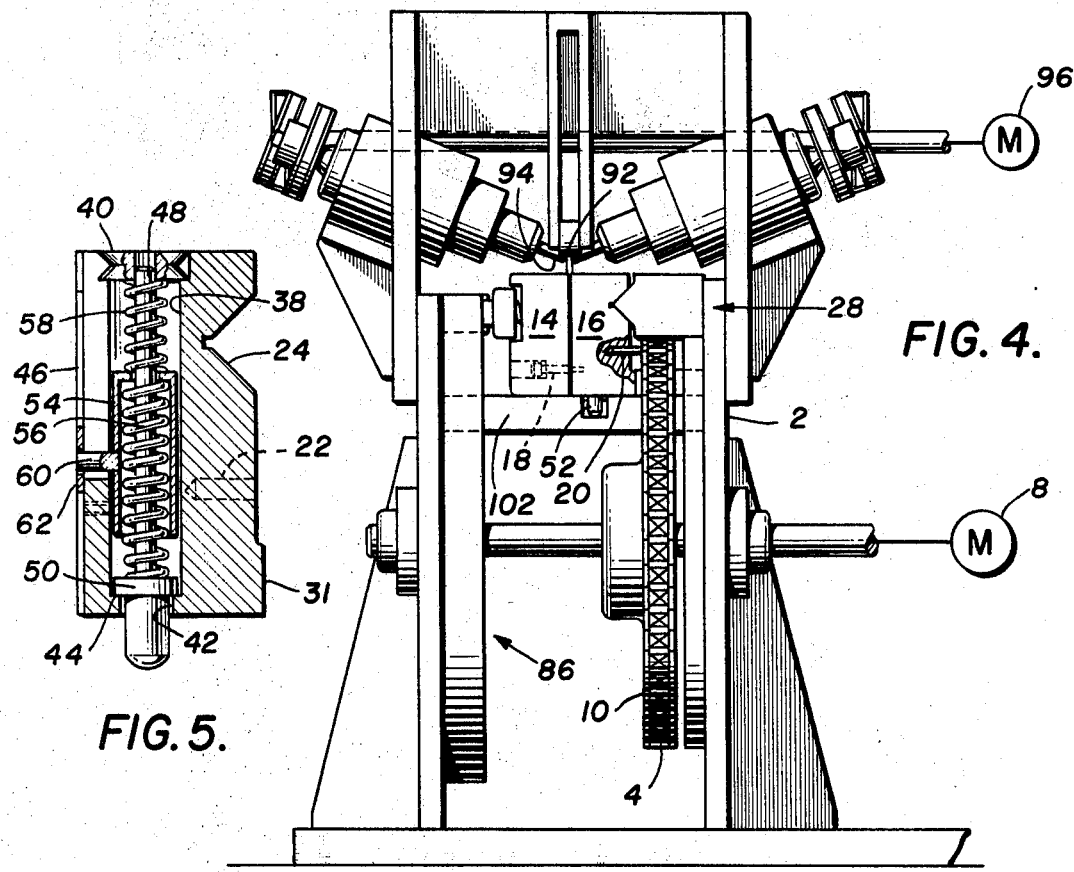

3,554,083

AUTOMATIC BLADE-EDGING MACHINE

BACKGROUND OF THE INVENTION

It is the object of the invention to provide an automatic blade-edging machine to improve over the practice of forming edges on unfinished blades by manually carrying each blade, singly, to a cutting tool and working an edge on the blade.

SUMMARY OF THE INVENTION

In brief, the automatic blade edger comprises a conveyor-driven, circulating train of spring-biased blade carriers that are each filled with an unedged blade and thereafter automatically conveyed, sequentially, into contact with blade positioner and clamping cam tracks, delivered to an edge-cutting station where an edge is cut of the blade, moved out of contact of the blade-clamping cam track to release the clamping force applied on the blade, reversed in its path of travel and inverted to allow the edged blade to eject from the blade carrier, and then recirculated to repeat the operation.

BRIEF DESCRIPTION OF THE DRAWINGS

In the drawings:

FIG. 3 is a perspective exploded view illustrating a blade carrier module of the edging machine;

FIG. 4 is a side elevation view as seen along 4—4 of FIG. 1; and

FIG. 5 is cross section view taken along 5—5 of FIG. 3.

DESCRIPTION OF A PREFERRED EMBODIMENT

Figure 1:
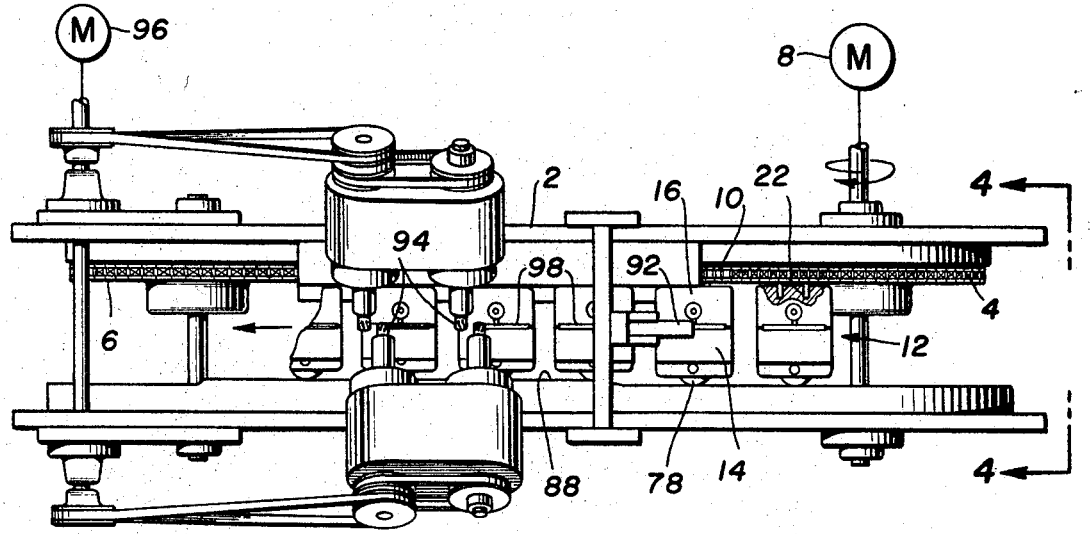
FIG. 1 is a plan view of the blade-edging machine.

Referring to the drawings, FIG. 1, the invention comprises a supporting frame 2 having a pair of sprockets, 4 and 6, rotatably mounted thereon in spaced relation one in front of the other. Sprockets 4 and 6 have parallel and horizontally disposed axes, and are driven by a motor 8 and an endless chain 10 laced or looped around the sprockets, conventionally. Sprockets 4 and 6 are spaced sufficiently so that chain 10 follows a racetrack path circulating in a vertical plane with an upper strand moving in one direction and a lower strand moving in the opposite direction.

A plurality of blade carriers 12 are connected to chain 10, in cantilevered suspension and at equispaced interval, to form a circular, endless belt or train of carriers 12. In the drawings, some of the blade carriers 12 have been omitted for clarity of illustration. In practice the chain 10 is completely filled with carriers.

As shown in FIG. 3, each carrier 12 comprises a unit composed of two blocks, 14 and 16, connected by shoulder screws 18. Screws 18 have thread engagement and shoulder abutment with block 16 and extend slidingly through block 14 so that the latter is slidably displaceable thereon.

Block 16 mounts, slidably, on pins 20 projecting laterally from chain 10 and extending within mating bores 22 in block 16. At its side contiguous to chain 10, block 16 has a horizontal V-shaped groove 24 that, during a part of the operation, slidably contacts a complementary V-shaped longitudinal rib or rail 26 formed on a bar 28 supported on frame 2.

Bar 28 extends horizontally along a linear stretch of the upper span or strand of chain 10 and has a longitudinal groove 30 extending parallel with and below rail 26. The upper strand of chain 10 passes through and is supportingly backed up by the inner wall defining groove 30 to control its lateral displacement. Rail 26 provides additional support to and controls the movement of carriers 12 in a straight linear path. Below V-groove 24, block 16 has an offset longitudinal flat surface 31 that slidably contacts bar 28 below groove 30, FIGS. 3 and 4, for controlling lateral displacement of the carrier 12.

Figure 2:
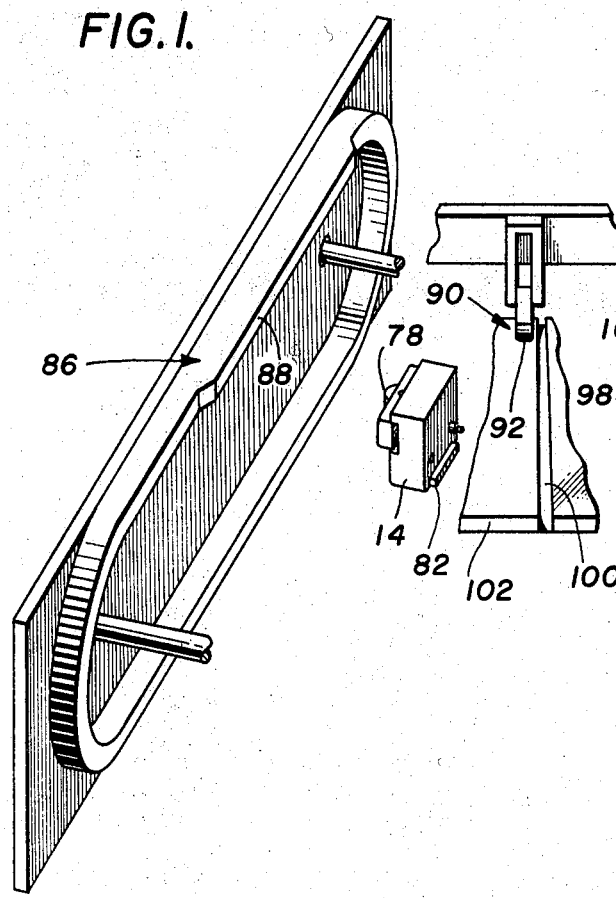
FIG. 2 is an isometric view with parts broken away showing cam track components of the blade-edging machine.
Figure 2:
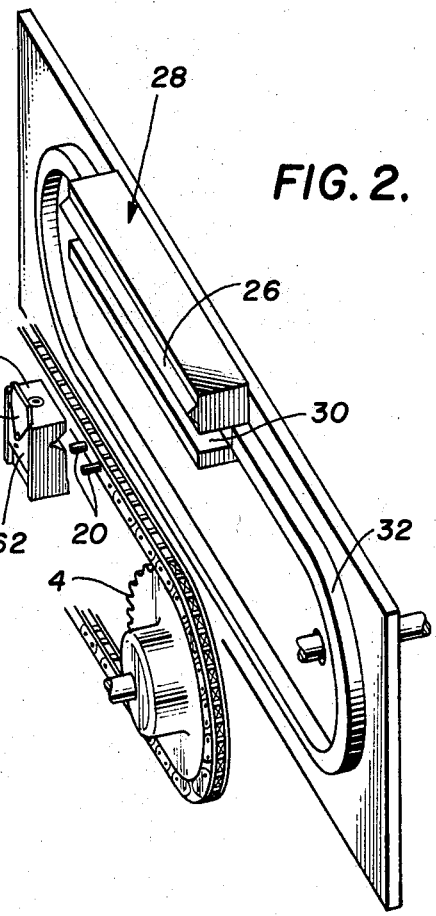

Lateral displacement and vibration of chain 10, along its circuitous path other than along the length of its upper strand, is controlled by a C-plate 32, FIG. 2, mounted on frame 2 in close juxtaposition to the side of chain 10. Plate 32, at its open ends, joins with the ends of bar 28 to form one continuous, circular track member similar in outline to that of chain 10, FIG. 2.

The inner sidewall of block 16, adjacent to block 14, has opposed, vertical, marginal ledges 34, FIGS. 3 and 5, defining a space 36 therebetween, and has a vertical bore 38 extending therethrough. Bore 38 has an annular ferrule 40 mounted at its upper end, and has a smaller diameter portion 42 at its lower end. A shoulder 44 separates the different diameters of bore 38. A longitudinal slot 46 extending downwardly from the upper end of bore 38 opens the latter bore to space 36. Positioned centrally within bore 38 is a pin 48 that is guided slidably at its upper end within ferrule 40. At its lower end, pin 48 has a collar 50 and a stem portion 52 that extends outwardly through the smaller diameter portion 42 of bore 38.

A cylindrical spring retainer 54 is coaxially arranged about pin 48 and is slidable at its upper, closed end on pin 48. The lower end of spring retainer 54 is open permitting a helical spring 56 to be mounted on the lower end of pin 48 and to extend into the spring retainer 54. Spring 56 is retained between the upper closed end of sleeve retainer 54 and collar 50 of pin 48. Another smaller helical spring 58 surrounds the upper end of pin 48 and is caged between the upper end of spring retainer 54 and ferrule 40. Springs 56 and 58 normally bias collar 50 of pin 48 into contact with shoulder 44 of bore 38.

A short boss of finger 60 extends perpendicularly from spring retainer 54 and projects through slot 46 into space 36. Springs 56 and 58 have chosen values for biasing spring retainer 54 at a level on pin 48 so that finger 60 is normally balanced at a height above the lower end of slot 46.

A blade seat plate 62, having a centrally located mounting hole 64, is positioned between ledges 34 and is slidably movable upwardly and downwardly therebetween. Seat plate 62 is mounted on finger 60 with the latter extending through hole 64. Preferably, seat plate 62 has a thickness no greater than the width of ledges 34, and has a seating surface 66 at its upper edge that is normally below the upper surface of block 16 when plate 62 is mounted on finger 60. Seat surface 66 is illustrated in V-shape however, other shapes may be used.

As noted above, block 14 attaches to block 16 by shoulder screws 18. Block 14, at its outer side, has a slot 68 extending lengthwise thereacross, has a recess 69 projecting inwardly from the slotted surface 68 and has counterbored threaded bores 70 extending inwardly from recess 69. A cam roller retainer plate 71 is mounted, biasingly, adjacent to slot 68 by screws 72 and springs 74, the latter being caged between plate 71 and counterbores 70. Plate 71 has an opening or aperture 76 therein, and a cam roller 78 is mounted rotatably in the opening 76 about a pin 80 fitted in plate 71. Pin 80 extends transversely across opening 76. The peripheral surface of cam roller 78 projects outwardly of plate 70 and the cam roller 78 is movable inwardly and outwardly of recess 69.

The lower end of the inside wall of block 14 has a longitudinal spacer or rib 82 that fits into space 36 between ledges 34 when blocks 14 and 16 are assembled. Spacer rib 82, preferably, has a width slightly greater than the width of ledges 36 and may vary according to the width of the blades to be edged.

Preferably, the overall length of the unthreaded portions of shoulder screws 18 comprises the length extending through block 14 and an additional length slightly in excess of that required to accommodate rib 82 on block 14. When blocks 14 and 16 are assembled, that portion of space 36 between blocks 14 and 16 defined above the V-shaped seat surface 66 of seat plate 62 between ledges 34 becomes a blade insertion slot 84.

Cam roller rolls contactingly along a circular, racetrack cam plate 86 mounted on frame 2 opposite to chain 10. Cam plate 86, at its side facing cam roller 78 of carrier 12 has a raised cam surface 88 extending for a distance along its upper length. The cam roller 78 contacts and rolls on the cam plate 86 whereby block 14 is biasingly cammed toward block 16, and block 16 is biased into contact with bar 28, FIG. 4.

A blade-camming and -aligning bar 90, supported by frame 2, is arranged in overhanging relation above the blade carriers 12. Bar 90 has a lower longitudinal cam surface 92, tapered at its frontal end, FIG. 4, and aligned in the vertical plane of travel of the blade insertion slots 84 of carriers 12. Aligning bar 90 has a prearranged height for depressing and horizontally aligning blades conveyed to the bar 90, as will be explained in the description of the operation of the machine.

A plurality of end mills 94 are arranged in overhanging and angled relation above the carrier train and to the left of aligning bar 90, FIG. 1. Mills 94 are driven conventionally by a motor and belt drive 96, and are at a predetermined height for contacting and edging blades 98 conveyed to the mills 94 by carriers 12.

A longitudinal cam groove 100 is provided at the upper side of a plate 102, FIGS. 2 and 4, for camming stem 52 upwardly when the carriers 12 are traveling along the upper level of their circulating path. Plate 102 is arranged between chain 10 and cam plate 86, and cam groove 100 is aligned in the plane of travel of stem 52 of each carrier 12. Preferably, the forward end of the cam groove 100 is tapered to permit stem 52 to ride onto groove 100.

In operation, chain 10 is driven to convey carriers 12 in a continuous circulating racetrack path, about a horizontal axis, at a predetermined speed moving carriers 12 leftwardly at the top of the path, FIG. 1, and rightwardly at the bottom of the path, FIG. 1. While the carriers 12 are circulated by chain 10, the cam roller 78 rolls on cam plate 86. If desired, cam plate 86 may be provided with a flange to provide additional support to the cam roller.

As each carrier 12 approaches the reversal at the left turnaround, the carrier 12 inverts because pins 20 of chain 10 keep the carrier 12 in the same position relative to chain 10. At the right turnaround, the carriers 12 are uprighted.

As each carrier 12 approaches the upper level of its travel and uprights, an operator fills the blade insertion slot 84 with an unedged blade 98. Blade 98 normally projects above the carrier 12 after being seated against plate 62. The carriers 12 are designed to permit blades 98 to be inserted into slots 84 with slight frictional resistance only.

A carrier 12, supplied with an unfinished blade 98, is conveyed under aligning bar 90 and at this time the upper edge of blade 98 contacts cam surface 92 while, simultaneously, stem 52 of pin 48 contacts cam groove 100. Cam groove 100 forces stem 52 upwardly while cam surface 92 forces blade 98 downwardly against the bias force of spring 58, FIGS. 4 and 5. The flat, longitudinal cam surface 92 of bar 90 positions blade 98 so that its upper blade edge is horizontally aligned. Ledges 34 prevent blade 98 from rotating. While still moving underneath bar 90 and while stem 52 is being cammed upwardly, the carrier cam roller 78 rides onto raised cam surface 88 causing block 14 to be spring biased toward block 16 and to apply a clamping force against blade 98. The carrier 12, in its clamped condition, moves leftwardly away from bar 90 and cam groove 100 and carries the blade 98 under mills 94. Mills 94 form an edge on the blade 98. Carrier 12 next moves leftwardly past mills 94 and the cam roller 78 now rolls off the cam 88 ramp thereby releasing the force applied on springs 74 and the clamping force applied on blade 98. The carrier 12 then makes a reversal to the lower level of travel and, in making the reversal, the carrier inverts. When the carrier 12 inverts. When the carrier 12 inverts, the sharpened blade falls out of the carrier 12, by the weight of the blade, into a collecting receptacle.

While the carrier 12 travels invertedly on the lower strand of chain 10, springs 56 and 58 restrain pin 48 from sliding out of bore 38.

Each carrier 12 is conveyed similarly and the operation is repeating. It will be understood that other metal working tools as grinders, polishers, and the like may be used other than the mills 94 illustrated, and that the tools may be arranged, serially, to provide a plurality of sequential metal processing steps.

We claim:

1. A stock-working machine comprising in combination:
driven endless conveyor means;
cam means;
at least one stock carrier having first and second slidably interconnected jaw members that provide a stock insertion slot therebetween;
means connecting said second jaw member to said endless conveyor means;
cam follower means mounted biasingly on said first jaw member and contacting said cam means whereby the latter acts against the bias of said cam follower means to displace said first jaw member slidingly toward said second jaw member for clamping stock in said slot; and
means for working said stock.

2. A stock-working machine as in claim 1, comprising a plurality of work carriers arranged in an endless chain.

3. A stock-working machine as in claim 1, comprising a biased seat connected to said second jaw member for seating stock material.

4. An automatic blade edger comprising combination:
a driven endless conveyor;
a cam track opposite said conveyor;
a plurality of blade carrier modules arranged in an endless train between said conveyor and said cam track; and
each blade carrier module having a first and a second member slidably connected and defining a slot therebetween;
a blade seat positioned in said slot;
a spring assembly in said second member connected to said blade seat to biasingly support said blade seat in said slot;
a spring-biased cam follower secured to said first member and engaging said cam track;
means for connecting said second member to said endless conveyor;
means for biasingly aligning a blade positioned within said slot against said blade seat;
means on said cam track for biasing said spring-biased cam follower and displacing said first member toward said second member for clamping and unclamping said blade within said slot; and
means for cutting an edge on said blade while the latter is clamped.

5. An automatic blade edger an claimed in claim 4, further comprising means for slidably supporting and guiding said plurality of blade carrier modules 6. An automatic blade edger as claimed in claim 4, further comprising means on each of said blade carrier modules for guiding and preventing the blade from turning within said slot means.

7. An automatic blade edger as claimed in claim 4, wherein each of said blade carrier modules is provided with a spacer to provide a predetermined clearance in said slot means:

8. An automatic blade edger as claimed in claim 4, wherein said spring-biased cam follower comprises a rotatable roller.

9. An automatic blade edger as claimed in claim 4, wherein said blade is automatically and sequentially aligned in said slot, clamped, milled, and unclamped.

10. An automatic blade edger as claimed in claim 4, wherein said conveyor is a chain and said means for connecting said second member to said chain comprises pins extending from said chain slidably into bores defined in said second member.